(12) United States Patent
Eshwar et al.

(10) Patent No.: US 8,930,352 B2
(45) Date of Patent: Jan. 6, 2015

(54) RELIANCE ORIENTED DATA STREAM MANAGEMENT SYSTEM

(75) Inventors: Bhavani K. Eshwar, Karnataka (IN); Abhinay R. Nagpal, Maharashtra (IN); Sandeep R. Patil, Elmsford, NY (US)

(73) Assignee: Lenovo Enterprise Solutions (Singapore) Pte. Ltd. (SG)

( * ) Notice: Subject to any disclaimer, the term of this patent is extended or adjusted under 35 U.S.C. 154(b) by 282 days.

(21) Appl. No.: 13/174,023

(22) Filed: Jun. 30, 2011

(65) Prior Publication Data

US 2013/0007044 A1  Jan. 3, 2013

(51) Int. Cl.
*G06F 17/30* (2006.01)

(52) U.S. Cl.
CPC .................. *G06F 17/30516* (2013.01)
USPC ............ 707/723; 707/749; 707/751; 707/769

(58) Field of Classification Search
USPC .................. 707/748, 723, 725, 749, 751, 769; 709/203, 219; 1/748
See application file for complete search history.

(56) References Cited

U.S. PATENT DOCUMENTS

| | | | |
|---|---|---|---|
| 7,287,016 B2 * | 10/2007 | Johnson et al. | 706/47 |
| 7,698,267 B2 * | 4/2010 | Papakonstantinou et al. | 707/999.005 |
| 7,836,057 B1 | 11/2010 | Micaelian et al. | |
| 7,865,608 B1 | 1/2011 | Schuba et al. | |
| 7,870,279 B2 | 1/2011 | Chuang et al. | |
| 8,117,175 B1 * | 2/2012 | Johnson et al. | 707/705 |
| 2007/0244865 A1 * | 10/2007 | Gordon et al. | 707/3 |
| 2009/0006310 A1 * | 1/2009 | Tanaka et al. | 707/1 |
| 2009/0100029 A1 * | 4/2009 | Jain et al. | 707/4 |
| 2009/0106214 A1 * | 4/2009 | Jain et al. | 707/4 |
| 2009/0112853 A1 | 4/2009 | Nishizawa et al. | |
| 2010/0205203 A1 * | 8/2010 | Anderson et al. | 707/769 |
| 2010/0251369 A1 * | 9/2010 | Grant | 726/23 |
| 2010/0262613 A1 | 10/2010 | Gupta et al. | |
| 2010/0306813 A1 * | 12/2010 | Perry et al. | 725/114 |
| 2011/0137937 A1 * | 6/2011 | Grosset et al. | 707/769 |
| 2011/0246457 A1 * | 10/2011 | Dong et al. | 707/725 |
| 2011/0264648 A1 * | 10/2011 | Gulik et al. | 707/722 |
| 2011/0270850 A1 * | 11/2011 | Wana et al. | 707/749 |
| 2011/0302583 A1 * | 12/2011 | Abadi et al. | 718/102 |
| 2012/0011170 A1 * | 1/2012 | Elad et al. | 707/804 |
| 2012/0136853 A1 * | 5/2012 | Kennedy et al. | 707/723 |
| 2012/0254198 A1 * | 10/2012 | Shih et al. | 707/751 |
| 2012/0291049 A1 * | 11/2012 | Park et al. | 719/318 |

(Continued)

OTHER PUBLICATIONS

Goebel, et al. "Data Stream Management Systems—A Technology for Network Monitoring and Traffic Analysis?", Tutorial—abstract, University of Oslo, Department of Informatics, Oslo, Norway, 8th International Conference on Telecommunications—ConTEL 2005, ISBN:953-184-081-4, Jun. 15-17, 2005, Zagreb, Croatia, pp. 685-686.

* cited by examiner

*Primary Examiner* — Noosha Arjomandi
(74) *Attorney, Agent, or Firm* — Katherine S. Brown; Jeffrey L. Streets

(57) ABSTRACT

A computer-implemented method comprises receiving a plurality of data streams into a data stream management system, wherein each data stream is obtained from a data streaming source and a reliance level is associated with each of the data streaming sources. When a continuous query is registered that specifies a reliance level attribute, the query is executed over the plurality of data streams using only those data streams obtained from a data streaming source associated with a suitable reliance level. For example, the reliance level attribute may establish a minimum reliance level, such that data stream having a lesser reliance level are not used. CQL may be enhanced with such an extra attribute which allows end users to specify the desired reliance level when submitting a query.

20 Claims, 3 Drawing Sheets

RELIANCE ORIENTED DATA STREAM MANAGEMENT SYSTEM

BACKGROUND

1. Field of the Invention

The present invention relates to data stream management systems and methods of data stream management.

2. Background of the Related Art

A Data Stream Management System (DSMS) manages data that is fed on-line via a stream. Traditional databases and Database Management Systems (DBMS) have been used in applications that require persistent data storage and complex querying. Usually, a database consists of a set of objects, with insertions, updates, and deletions occurring less frequently than queries. Queries are executed when posed and the answer reflects the current state of the database. However, the past few years have witnessed an emergence of applications that do not fit this data model and querying paradigm. Instead, much of the information to be queried occurs in the form of a sequence (stream) of data values. Examples of such data streams include sensor data, Internet traffic, financial tickers, on-line auctions, and transaction logs such as Web usage logs and telephone call records. A data stream is a real-time, continuous, ordered (implicitly by arrival time or explicitly by timestamp) sequence of items. It is impossible to control the order in which items arrive, nor is it feasible to locally store a stream in its entirety.

Structured Query Language (SQL) is a database computer language designed for managing data in relational database management systems (DBMS). Continuous Query Language (CQL) has similarities to SQL, but has extended support for real-time features adding data stream S as a new data type based on a series of time-stamped tuples. CQL supports windows on streams based on another new data type called "relation." A relation R is an unordered group of tuples at any time instant t which is denoted as R(t). The CQL relation differs from a relation of a standard relational database accessed using SQL, because traditional SQL's relation is simply a set (or bag) of tuples with no notion of time, whereas the CQL relation (or simply "relation") is a time-varying group of tuples (e.g. the current number of vehicles in a given stretch of a particular highway). All stream-to-relation operators in Stanford's CQL are based on the concept of a sliding window over a stream, where the sliding window that, at any point of time, contains a historical snapshot of a finite portion of the stream. Syntactically, sliding window operators are specified in CQL using a window specification language, based on SQL-99. Prior to operation on data streams, a continuous query is registered in a DSMS.

BRIEF SUMMARY

One embodiment of the present invention provides a computer-implemented method, comprising receiving a plurality of data streams into a data stream management system, wherein each data stream is obtained from a data streaming source, and associating a reliance level with each of the data streaming sources. When a query is registered that specifies a minimum reliance level, the query is executed over the plurality of data streams using only those data streams obtained from a data streaming source having at least the specified minimum reliance level.

Another embodiment of the invention provides a computer program product including computer usable program code embodied on a computer usable storage medium. The computer program product comprises computer usable program code for receiving a plurality of data streams into a data stream management system, wherein each data stream is obtained from a data streaming source, and computer usable program code for associating a reliance level with each of the data streaming sources. The computer program product further comprises computer usable program code for registering a query that specifies a minimum reliance level, and computer usable program code for executing the query over the plurality of data streams using only those data streams obtained from a data streaming source having at least the specified minimum reliance level.

Yet another embodiment of the invention provides a data stream management system, comprising a compiler, a scheduler and an execution engine. The compiler parses a continuous query and generates an abstract syntax tree including a plurality of operators, wherein the plurality of operators includes two or more source operators, one or more intermediate operators, and an output operator. The scheduler schedules execution of each of the plurality of operators in the continuous query, and the execution engine executes each of the plurality of operators as scheduled, wherein execution of the two or more source operators includes filtering out data from a data stream that does not meet a minimum reliance level indicated in the continuous query.

A still further embodiment of the invention provides a computer program product including computer usable program code embodied on a computer usable storage medium, wherein the computer program product comprises computer usable program code for parsing a continuous query and generating an abstract syntax tree including a plurality of operators, wherein the plurality of operators includes two or more source operators, one or more intermediate operators, and an output operator. The computer program product further comprises computer usable program code for scheduling execution of each of the plurality of operators in the continuous query, and computer usable program code for executing each of the plurality of operators as scheduled, wherein executing the two or more source operators includes filtering out data from a data stream that does not meet a minimum reliance level indicated in the continuous query.

DETAILED DESCRIPTION

Figure 1:
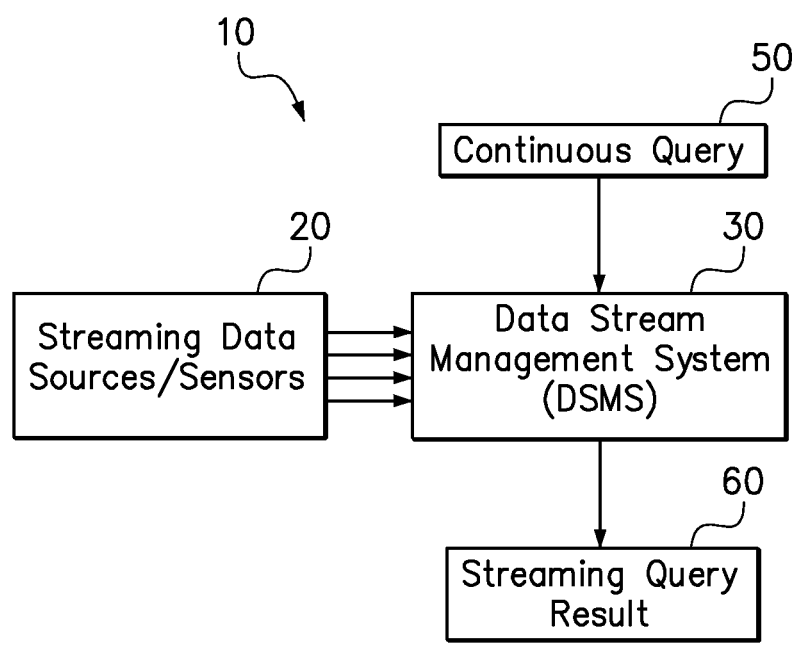
FIG. 1 is a block diagram showing streaming data input to a data stream management system (DSMS).

One embodiment of the present invention provides a computer-implemented method, comprising receiving a plurality of data streams into a data stream management system, wherein each data stream is obtained from a data streaming source, and associating a reliance level with each of the data streaming sources. When a query is registered that specifies a minimum reliance level, the query is executed over the plurality of data streams using only those data streams obtained from a data streaming source having at least the minimum reliance level specified in the query.

In accordance with the invention, a DSMS and an associated CQL system may now allow a user to specify reliance levels while placing a query over data streams coming in from streaming objects which have variance in reliability of the data. The user of the DSMS can derive results from the data streams, wherein the data stream sources or nodes producing the data streams are associated with a specified reliance level. For example, a user may submit a CQL query that specifies that the query results shall be derived only from trusted streams or from streaming objects having a specific level of trust. Alternatively, a user may submit a CQL query and receive results which are derived from all possible streams regardless of the level of trust.

Accordingly, CQL may be enhanced with an extra attribute which allows end users to specify the desired "Reliance Level" while submitting a query. Executing a query over the data streams with a specified reliance level instructs the DSMS system it should only consider data streams whose nodes have the given level of reliance or trust.

A data streaming source may be anything that produces a data stream (output) that can be digitized and input to a computer system for use by the data stream management system. For example, a data streaming source may be a sensor, a website, a satellite, and the like. Furthermore, a data streaming source can be trusted or untrusted. For example, a data stream originating from a business partner, your own entity's sensors, or a feed from a government body might be classified as trusted, whereas a data stream from a publicly available sensor/RFID data or an open feed might be classified as untrusted.

In accordance with various embodiments of the invention, a reliance level may be associated with each of a plurality of data streams that are accessible to the DSMS. The reliance level may be established through user input to the DSMS system to specify a reliance level to all known input nodes which stream in data. The user, such as a system administrator or approved agent, will typically associate or assign a reliance level to a data stream source during the setup or configuration process. This reliance level may be selectively associated for each data stream source, or data stream sources may be categorized such that all data stream sources in a category receive the same reliance level. In either case, the reliance level is persistently stored and manually updated, such as by administrators, or automatically updated in accordance with predetermined criteria.

A reliance level may be a qualitative or quantitative measure of reliability. As a non-limiting example, the reliance level may be a numerical index from 1 to 5, where the reliance level associated with a given data streaming source depends upon various objective or subjective factors. For example, a reliance level of 5 may be associated with streams from highly trusted sources like those owned by governments, business partners or self-owned by an entity performing the query. By contrast, a reliance level of 1 may be associated with streams coming from unknown third party sources. These reliance levels, as well as intermediate reliance levels, can be specified by the user. Still further, the reliance level associated with at least one of the data streaming sources may vary over time, either as a result of a manual change or an automatic change. For example, an initial or updated reliance level associated with at least one of the data streaming sources may be based on analysis of previous data received from the at least one data streaming source. Therefore, as the quality of the data improves or declines, the reliance level may similarly increase or decrease automatically A reliance level may be specified as an attribute of a user query to be run over the data streams. Where the user query is based on a continuous query language (CQL), the CQL may be enhanced or expanded to include a reliance level attribute. For example, the user query might specify a minimum reliance level or a range of reliance levels.

The DSMS has an enhanced query execution engine and data filtering system, so that the DSMS can identify the reliance level (RL) associated with the CQL query inputted and registered by the user, filter the data streams to use only data streams whose RL satisfies the requirement of the CQL query, and execute the query over the filtered input streams in order to return the result to the user. During registration of each new continuous query, the scheduler allocates a time slice for execution of each new operator therein. The scheduler operates without interrupting one or more operators that are being executed in a current time slice. Hence, in some cases, the processing of existing queries is altered to permit processing of the new query thereby to cause a switchover from a currently executing plan to a modified executing plan. Altering of normal processing is performed at the end of a current time slice, with no delay in execution of existing queries.

Optionally, a DSMS that is enabled with a reliance level query system may optimize the generation of a query plan, also referred to as an abstract syntax tree, by continuously monitor capturing any change events corresponding to the reliance level of a data stream source. In other words, when the reliance level of a data stream changes, the query plan may be adjusted so that the query results still reflect the reliance level specified in the query.

In a further option, the query plan (or abstract syntax tree (AST)) for a subsequently submitted continuous query may utilize or share an operator that already exists in a query plan that is currently being executed by the query execution engine, rather than create a new or separate operator on incoming streams. The operator may be shared since the operator is located in memory and merely requires a modification of the query plan.

Another embodiment of the invention provides a computer program product including computer usable program code embodied on a computer usable storage medium. The computer program product comprises computer usable program code for receiving a plurality of data streams into a data stream management system, wherein each data stream is obtained from a data streaming source, and computer usable program code for associating a reliance level with each of the data streaming sources. The computer program product further comprises computer usable program code for registering a query that specifies a minimum reliance level, and computer usable program code for executing the query over the plurality of data streams using only those data streams obtained from a data streaming source having at least the specified minimum reliance level. Optionally, the computer program product may further comprise computer usable program code for performing any one or more aspects of the foregoing computer-implemented methods.

Yet another embodiment of the invention provides a data stream management system, comprising a continuous query compiler, a scheduler and an execution engine. The compiler parses a continuous query and generates a query plan (or abstract syntax tree) including a plurality of operators, wherein the plurality of operators includes two or more source operators, one or more intermediate operators, and an output operator. The scheduler schedules execution of each of the plurality of operators in the continuous query, and the execution engine executes each of the plurality of operators as scheduled, wherein execution of the two or more source operators includes filtering out data from a data stream that does not meet the reliance level attributes indicated in the continuous query. The two or more source operators may each provide a source of tuples from an incoming data stream in response to the incoming data stream having at least the minimum reliance level specified in the continuous query.

For each operator in the query plan, the continuous query compiler generates a list that identifies those inputs to the operator that are known to be based on reliance level (RL) relations. Hence, the DSMS maintains information on the reliance level of the various inputs to each operator. An operator's output data constitutes a trust level that is dependent upon the reliance level of the data streams input to the operator. Accordingly, a list of data streams and their reliance levels may be prepared for each operator at the same time the query plan is being generated by the continuous query compiler.

The nodes of a tree in the query plan are typically logical operators similar to relational SQL for example SELECT, UNION and JOIN. Further, the system creates physical operators and allocates resources, such as heap memory as well as a queue, needed to process this query. Physical operators accept data streams and/or relations as input and generate data streams and/or relations as output. In this process, if a new continuous query uses an operator that already exists in a global query plan located in memory (i.e., that is currently being executed by the query execution engine on incoming data streams), then the continuous query compiler does not need to create a new physical operator. Instead, the continuous query compiler may modify the executing query plan in memory in order to make further use of the output from the existing operator.

A still further embodiment of the invention provides a computer program product including computer usable program code embodied on a computer usable storage medium, wherein the computer program product comprises computer usable program code for parsing a continuous query and generating an abstract syntax tree including a plurality of operators, wherein the plurality of operators includes two or more source operators, one or more intermediate operators, and an output operator. The computer program product further comprises computer usable program code for scheduling execution of each of the plurality of operators in the continuous query, and computer usable program code for executing each of the plurality of operators as scheduled, wherein executing the two or more source operators includes filtering out data from a data stream that does not meet a minimum reliance level indicated in the continuous query. It should be recognized the computer program product may further include computer usable program code for implementing any one or more aspect of the data stream management system described herein, the methods described herein and/or the enhanced CQL system described herein.

EXAMPLE

A DSMS has access to several data streams that provide continuous streams of temperature values for the state of Texas in the United States (US-Texas). These continuous data streams can originate from a private weather channel, sensors of local vendors, government meteorological climate department sensors, etc. A user running some analytics over this live data for some kind of research may have the need to limit which sources are considered. For example, the user may submit a CQL query that will only consider those data streams that originate with a source having a specified reliance level. Before the execution of the CQL query, the reliance level of each data stream is monitored and updated in DSSR or equivalent. Accordingly, any recent change in the reliance level associated with one of the data streams will be reflected in the execution of the query. Even after the CQL query has begun execution, the query result can reflect a deteriorated reliance level associated with one of the data streams, such as by marking the query result as dirty or flagging the user with an alert.

Consider the following query:
Select current temperature_of_US_Texas from all available streams, where reliance level of the streams >=3 and time windows [3 minutes]

The above query is pre-compiled and stored and is expected to sample for 3 minutes. For the purpose of this example, there are three (3) data stream sources:

Source A—Weather Channel's Temperature Ticker in XML (extensible markup language) form.

Source B—A privately owned astrological laboratory providing temperature readings over a PSTN (public switched telephone network) line in the form of CSV (comma separated values) text.

Source C—US Navy Met Network providing an RSS (really simple syndication) feed.

In this example, the reliance level of a data stream is an integer value from 1 to 5, where a reliance level of 5 indicates the highest possible reliability and a reliance level of 1 is the lowest possible reliability. Source A has been assigned a default reliance level of 3; Source B has been assigned a default reliance level of 5; and Source C has been assigned a default reliance level of 4. These default reliance levels are assigned during configuration of the DSMS and the QoS (Query on Stream) takes six (6) readings per minute. The operator implementation processes the various data streams and provides a decimal value for the temperature.

For the purpose of this example, the reliance level of the data streams from Sources A and C are manually configured, and Source B is automatically configured by a bootstrap monitor on Source B which re-sets the reliance level to 5 from any prior value. However, the bootstrap monitor on Source B will manipulate the reliance level to 0 in response to an electrical charge reading on another sensor and [inactivity of the sensor OR a large delta of current reading on a weighted reading average of last 30 seconds OR a missed reading on the 10th second].

Sources A, B and C have produced temperature reading of 75.6, 77 and 75.7 F, respectively, for about 1.29 minutes, and it can be assumed for the purpose of this example that these temperature readings are going to remain constant for the next 5 minutes or so. Given the CQL windows prescribed in the foregoing query, the DSMS will keep executing the pre-processed persisted query for a window of 3 minutes. If there is a lightening strike at the location of Source B at 1.30 minutes, and the sensor there reports high temperature readings. The Source B monitor implementation fires, and responds by reducing the reliance level of Source B to 0 and triggering a change event. This in turn results in an in-memory query plan update to ignore analyzing data streams from Source B. So, between 1.30 minutes and 1.31 minutes, the system will only see 75.6, and 75.7 F. If, for example, a back-up temperature sensor at Source B is turned on after 1.31 minutes, then the startup of the back-up sensor causes the default reliance level to be assigned during its boot-strapping, and then another change event is fired to include results coming in from the back-up sensor.

This example illustrates that a data stream, such as a sensor reading, may be completely ignored due to a low reliance level. The same situation is applicable in cases where the reliance level is reduced to a lower number or category identifier which in turn results in Source B's output not being considered.

FIG. 1 is a block diagram of a system 10 showing streaming data 20 input to a data stream management system (DSMS)

30. The streaming data may come from any of various data sources. A user may submit a continuous query 50 to the DSMS 30 for execution over the data streams 20. As a result, the DSMS 30 generates a streaming query result 60 in accordance with the instructions provided by the continuous query 50.

Figure 2:
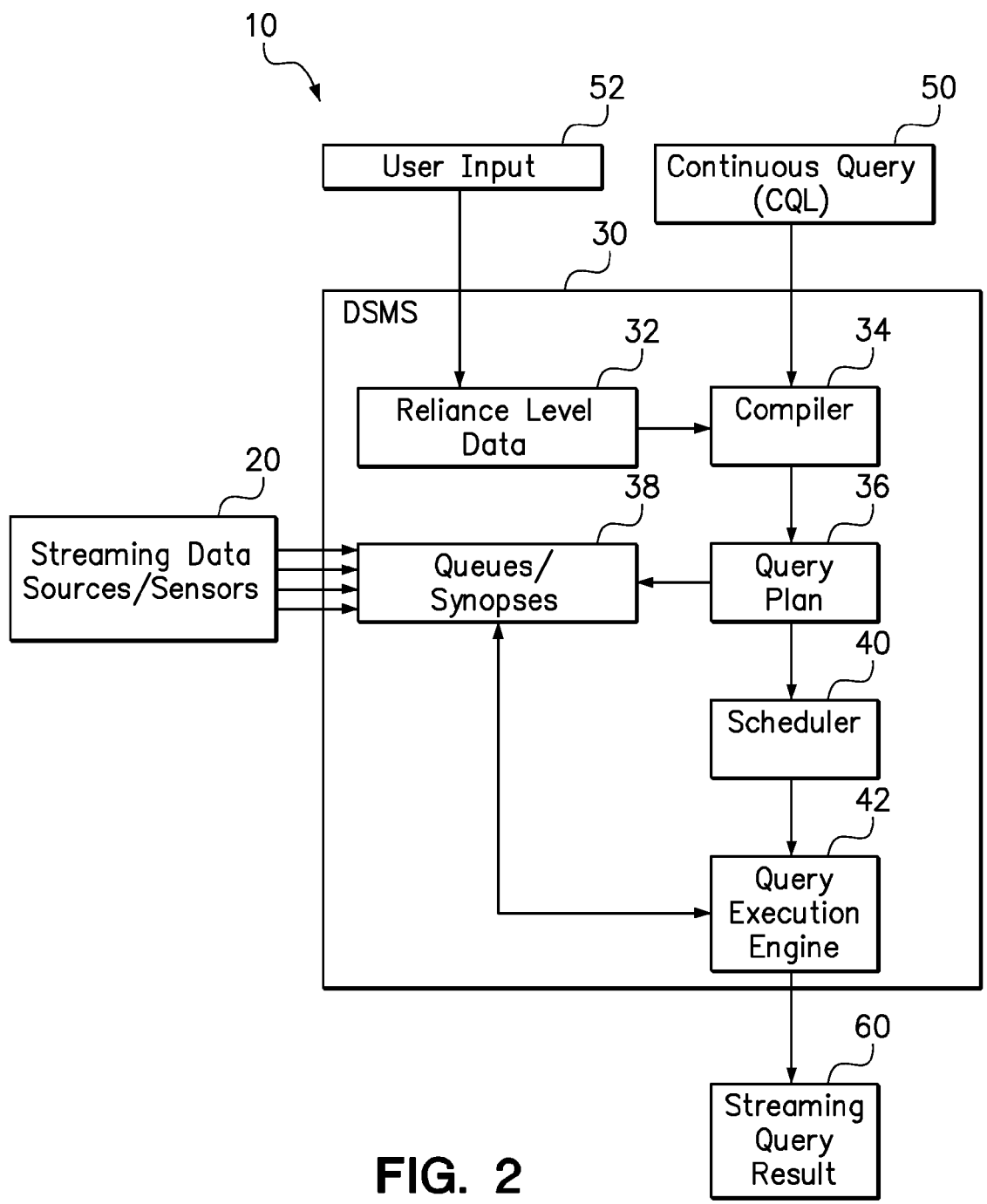
FIG. 2 is a block diagram of a data stream management system (DSMS) for handling a user query.

FIG. 2 is a block diagram of the same system 10 as in FIG. 1, but illustrating greater detail of the data stream management system (DSMS) 30 for handling a continuous query 50. User input 52 is provided, for example by a system administrator, to the DSMS 30 during configuration. The user input 52 provides a reliance level for each data stream source, and the DSMS stores this input as reliance level data 32. Upon registration of a user's continuous query 50, a compiler 34 generates a query plan 36. In accordance with the query plan, queues and synopses 38 are set up in memory for use during execution of the query plan 36. A scheduler 40 is responsible for determining when various operators in the query plan should be executed by the query execution engine 42. During execution, the query execution engine 42 accesses the queues and synopses 38 to generate intermediate data as well as the streaming query result 60.

Figure 3:
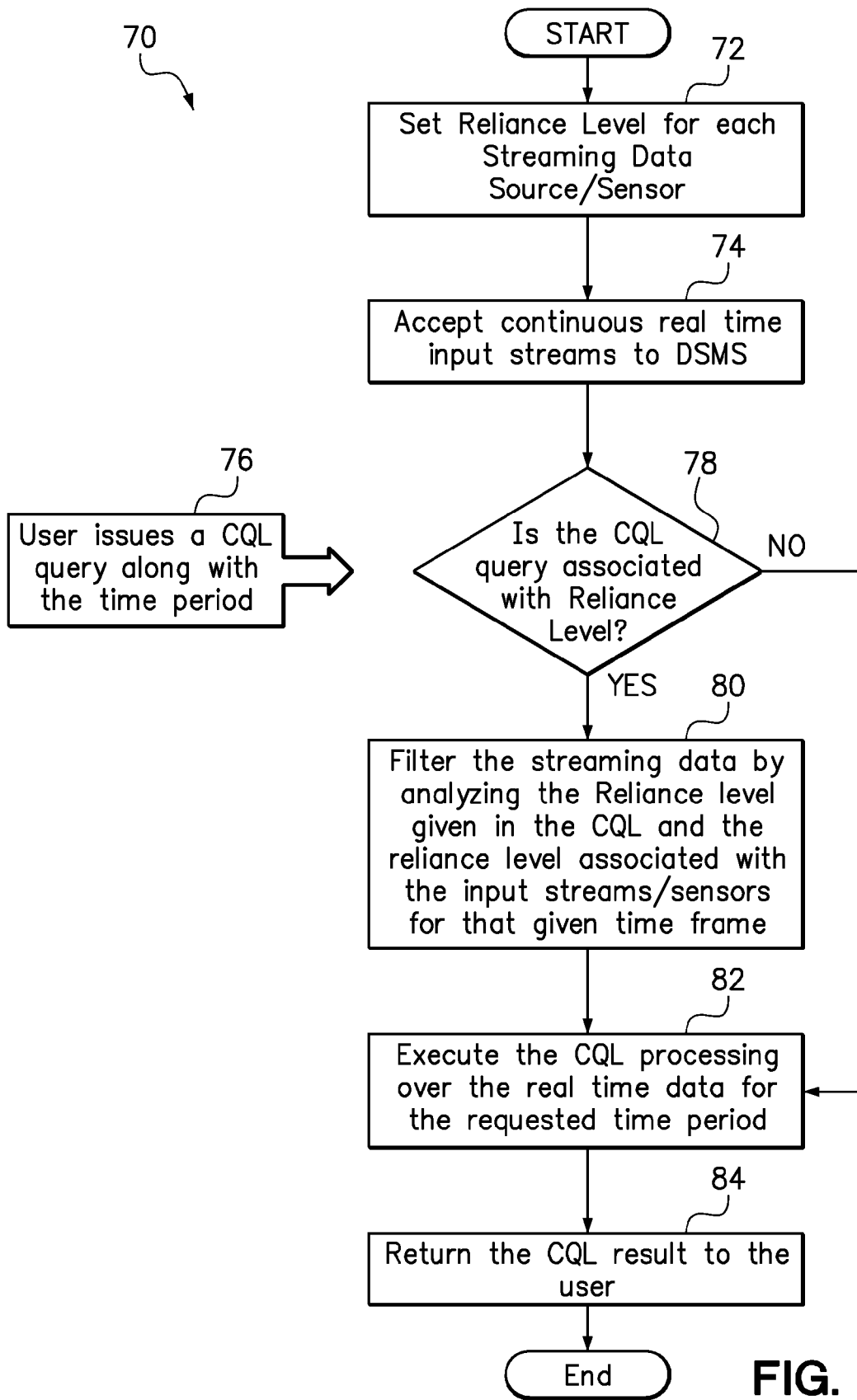
FIG. 3 is a flowchart of a method of data stream management.

FIG. 3 is a flowchart of a method 70 of data stream management. In step 72, a reliance level is set for every streaming data source or sensor. In step 74, continuous real time input streams are accepted into the DSMS. When the user issues a CQL query along with the time period, per step 76, then step 78 determines whether the CQL query is associated with a reliance level. Is the CQL query includes a reliance level attribute, then step 80 filters the streaming data by analyzing the reliance level given in the CQL in comparison to the reliance level associated with the input streams/sensors for that given time period. Only those data stream having a reliance level meeting the reliance level attribute of the query will be used. After filtering the streaming data in step 80 or if the CQL query is determined to not include a reliance level attribute in step 78, then step 82 executes the CQL processing over the real time data for the requested time period. In step 84, the CQL result is returned to the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   receiving a plurality of data streams into a data stream management system, wherein each data stream is obtained from a data streaming source;
   associating a reliance level with each of the data streaming sources; registering a query that specifies a minimum reliance level; and
executing the query over the plurality of data streams using only those data streams obtained from a data streaming source having at least the specified minimum reliance level;
   wherein the reliance level associated with at least one of the data streaming sources is based on analysis of previous data received from the at least one data streaming source.

2. The method of claim 1, wherein each of the data streams are continuous real time input streams.

3. The method of claim 1, wherein the reliance level associated with at least one of the data streaming sources varies over time.

4. The method of claim 1, wherein the query further specifies a time period.

5. The method of claim 1, wherein the query is provided in a continuous query language.

6. The method of claim 1, further comprising:
   monitoring for any change in the reliance level of the data streaming nodes.

7. A computer program product including non-transitory computer usable program code embodied on a non-transitory computer usable storage medium, the computer program product comprising:
   computer usable program code for receiving a plurality of data streams into a data stream management system, wherein each data stream is obtained from a data streaming source;
   computer usable program code for associating a reliance level with each of the data streaming sources;
   computer usable program code for registering a query that specifies a minimum reliance level; and
   computer usable program code for executing the query over the plurality of data streams using only those data streams obtained from a data streaming source having at least the specified minimum reliance level;
   wherein the reliance level associated with at least one of the data streaming sources is based on analysis of previous data received from the at least one data streaming source.

8. The computer program product of claim 7, wherein each of the data streams are continuous real time input streams.

9. The computer program product of claim 7, wherein the reliance level associated with at least one of the data streaming sources varies over time.

10. The computer program product of claim 7, wherein the query further specifies a time period.

11. The computer program product of claim 7, wherein the query is provided in a continuous query language.

12. The computer program product of claim 7, further comprising:
    computer usable program code for monitoring for any change in the reliance level of the data streaming nodes.

13. A computer program product including non-transitory computer usable program code embodied on a non-transitory computer usable storage medium to provide data stream management, the computer program product comprising:
    computer usable program code providing a compiler for parsing a continuous query and generating an abstract syntax tree including a plurality of operators, wherein the plurality of operators includes two or more source operators, one or more intermediate operators, and an output operator;
    computer usable program code providing a scheduler for scheduling execution of each of the plurality of operators in the continuous query;
    computer usable program code providing an execution engine that executes each of the plurality of operators as scheduled, wherein execution of the two or more source operators includes filtering out data from a data stream that does not meet a minimum reliance level indicated in the continuous query;
    wherein the two or more source operators each provide a source of tuples from an incoming data stream in response to the incoming data stream having at least the minimum reliance level.

14. The computer program product of claim 13, wherein the incoming data stream is receiving over a network link from a sensor node.

15. The computer program product of claim 13, wherein the continuous query includes a stream data type and a relation data type.

16. The computer program product of claim 13, wherein the compiler generates a list for each operator that identifies the inputs to each operator that is known to have the minimum reliance level indicated in the continuous query.

17. A computer program product including non-transitory computer usable program code embodied on a non-transitory computer usable storage medium, the computer program product comprising:
   computer usable program code for parsing a continuous query and generating an abstract syntax tree including a plurality of operators, wherein the plurality of operators includes two or more source operators, one or more intermediate operators, and an output operator;
   computer usable program code for scheduling execution of each of the plurality of operators in the continuous query;
   computer usable program code for executing each of the plurality of operators as scheduled, wherein executing the two or more source operators includes filtering out data from a data stream that does not meet a minimum reliance level indicated in the continuous query;
   wherein the two or more source operators each provide a source of tuples from an incoming data stream in response to the incoming data stream having at least the minimum reliance level.

18. The computer program product of claim 17, wherein the incoming data stream is receiving over a network link from a sensor node.

19. The computer program product of claim 17, wherein the continuous query includes a stream data type and a relation data type.

20. The computer program product of claim 17, wherein the compiler generates a list for each operator that identifies the inputs to each operator that is known to have the minimum reliance level indicated in the continuous query.

* * * * *